(12) United States Patent
Sekhar

(10) Patent No.: US 10,668,574 B2
(45) Date of Patent: Jun. 2, 2020

(54) HIGH TEMPERATURE DEVICES AND APPLICATIONS EMPLOYING PURE ALUMINUM BRAZE FOR JOINING COMPONENTS OF SAID DEVICES

(71) Applicant: Jainagesh Sekhar, Cincinnati, OH (US)

(72) Inventor: Jainagesh Sekhar, Cincinnati, OH (US)

(73) Assignee: MHI Health Devices, LLC, Cincinnati, OH (US)

( * ) Notice: Subject to any disclaimer, the term of this patent is extended or adjusted under 35 U.S.C. 154(b) by 8 days.

(21) Appl. No.: 15/885,870

(22) Filed: Feb. 1, 2018

(65) Prior Publication Data

US 2018/0214992 A1  Aug. 2, 2018

Related U.S. Application Data

(60) Provisional application No. 62/453,559, filed on Feb. 2, 2017.

(51) Int. Cl.
*B23K 1/00* (2006.01)
*B23K 35/28* (2006.01)
(Continued)

(52) U.S. Cl.
CPC .......... *B23K 35/286* (2013.01); *B23K 1/0008* (2013.01); *B23K 1/0016* (2013.01);
(Continued)

(58) Field of Classification Search
CPC ........ B23K 1/0016; B23K 35/00; B23K 1/19; B23K 1/012; B23K 1/0056; B23K 35/0233; B23K 1/20; B23K 1/0008; B23K 2101/20; B23K 2103/18; B23K 2101/36; B23K 2103/52; B23K 2103/02; B23K 1/00–206; B23K 2103/10; B23K 35/3607; B23K 35/286–288
(Continued)

(56) References Cited

U.S. PATENT DOCUMENTS 3,259,973 A * 7/1966 Quaas ................ B23K 35/286
148/26
3,917,151 A * 11/1975 Robinson ............ B23K 35/002
228/220

(Continued)

FOREIGN PATENT DOCUMENTS

CH  105418132  3/2016
DE  3307702 A1 * 9/1984  ........... C04B 37/026
(Continued)

OTHER PUBLICATIONS

Machine translation of JP-06115009-A (no date avaiable).*
(Continued)

*Primary Examiner* — Kiley S Stoner
(74) *Attorney, Agent, or Firm* — Michael C. Connelly

(57) ABSTRACT

The present applicant presents a structure intended for high temperature use above 30° C. comprising multiple components having metal-to-metal or metal-to-ceramic contacting surfaces wherein the surfaces are joined by a braze composed of pure aluminum. Anticipated devices include but are not limited to igniters as well as electronic applications in the automotive and aerospace industries.

9 Claims, 1 Drawing Sheet

(51) Int. Cl.
*B23K 1/20* (2006.01)
*B23K 35/02* (2006.01)
*B23K 1/005* (2006.01)
*B23K 35/00* (2006.01)
*B23K 1/19* (2006.01)
*B23K 1/012* (2006.01)
*B23K 101/20* (2006.01)
*B23K 103/02* (2006.01)
*B23K 103/00* (2006.01)
*B23K 101/36* (2006.01)
*B23K 103/18* (2006.01)

(52) U.S. Cl.
CPC ............ *B23K 1/0056* (2013.01); *B23K 1/012* (2013.01); *B23K 1/19* (2013.01); *B23K 1/20* (2013.01); *B23K 35/00* (2013.01); *B23K 35/0233* (2013.01); *B23K 2101/20* (2018.08); *B23K 2101/36* (2018.08); *B23K 2103/02* (2018.08); *B23K 2103/18* (2018.08); *B23K 2103/52* (2018.08)

(58) Field of Classification Search
USPC ...... 228/121–124.7, 245–262, 262.5–262.51
See application file for complete search history.

(56) References Cited

U.S. PATENT DOCUMENTS

| | | | | |
|---|---|---|---|---|
| 3,985,283 | A * | 10/1976 | Gempler | B23K 1/20 228/193 |
| 4,431,465 | A * | 2/1984 | Mizuhara | B23K 35/025 148/24 |
| 4,552,301 | A * | 11/1985 | Liehr | B23K 20/22 228/122.1 |
| 4,602,731 | A * | 7/1986 | Dockus | B23K 35/001 228/121 |
| 4,729,504 | A * | 3/1988 | Edamura | B23K 1/0008 228/122.1 |
| 4,763,828 | A * | 8/1988 | Fukaya | C04B 37/026 228/124.1 |
| 4,859,531 | A * | 8/1989 | Tsuji | B23K 35/3006 428/333 |
| 4,872,606 | A * | 10/1989 | Satoh | C04B 37/006 228/121 |
| 4,897,243 | A * | 1/1990 | Mizuhara | B23K 35/302 420/488 |
| 5,372,298 | A * | 12/1994 | Glaeser | B23K 20/023 228/121 |
| 5,794,838 | A * | 8/1998 | Ushikoshi | C04B 37/006 228/121 |
| 5,906,897 | A * | 5/1999 | Tanaka | B23K 35/002 428/627 |
| 6,106,960 | A * | 8/2000 | Fujii | C04B 37/006 428/627 |
| 6,109,960 | A * | 8/2000 | Cooper | H01R 33/94 439/546 |
| 9,643,877 | B2 | 5/2017 | Sekhar | |
| 2002/0037435 | A1* | 3/2002 | Hirashima | C04B 37/026 428/693.1 |
| 2005/0079376 | A1* | 4/2005 | Benedictus | B23K 1/0012 428/654 |
| 2006/0105193 | A1* | 5/2006 | Burger | B23K 35/00 428/654 |
| 2008/0087710 | A1* | 4/2008 | Glaeser | C04B 35/645 228/121 |
| 2009/0159642 | A1* | 6/2009 | Klein | B23K 1/012 228/101 |
| 2011/0020666 | A1* | 1/2011 | Wakisaka | B23K 1/14 428/650 |
| 2011/0194973 | A1* | 8/2011 | Anderson | B23K 35/0227 420/534 |
| 2012/0121896 | A1* | 5/2012 | Ning | C04B 37/006 428/336 |
| 2012/0160084 | A1* | 6/2012 | Mosser | B23K 1/0008 89/36.02 |
| 2013/0136878 | A1* | 5/2013 | Elliot | B23K 1/0016 428/34.6 |
| 2013/0180976 | A1* | 7/2013 | Elliot | B23K 1/0008 219/468.1 |
| 2013/0181038 | A1* | 7/2013 | Elliot | B23K 1/0008 228/191 |
| 2013/0292816 | A1* | 11/2013 | Otaki | B32B 15/01 257/706 |
| 2015/0108203 | A1* | 4/2015 | Elliot | B23K 1/0016 228/121 |
| 2015/0314390 | A1* | 11/2015 | Otsuka | B23K 20/16 403/272 |
| 2017/0106463 | A1* | 4/2017 | Sekhar | B23K 1/0056 |
| 2017/0197270 | A1* | 7/2017 | Shuck | B23K 1/0008 |
| 2017/0347440 | A1 | 11/2017 | Sekhar | |

FOREIGN PATENT DOCUMENTS

| | | | | |
|---|---|---|---|---|
| JP | 63180387 | A * | 7/1988 | ............ B23K 20/04 |
| JP | 06115009 | A * | 4/1994 | ............ C04B 37/005 |
| JP | 2015185679 | A * | 10/2015 | |

OTHER PUBLICATIONS

Gopalakrishna, V. and Sekhar, J.A., Thermal Analysis and Flowability Correlations in Iron-Carbon-Silicon Alloys, I and II, Transactions of the American Foundrymen's Society, 1987.

* cited by examiner

HIGH TEMPERATURE DEVICES AND APPLICATIONS EMPLOYING PURE ALUMINUM BRAZE FOR JOINING COMPONENTS OF SAID DEVICES

CROSS REFERENCE TO RELATED APPLICATIONS

This patent application claims the benefit of provisional patent application Ser. No. 62/453,559, filed on Feb. 2, 2017 by the present applicants, the disclosure of which is incorporated by reference herein in its entirety.

BACKGROUND

Metal-to-metal and metal-to-ceramic joining are very important technological needs. Difficulties are encountered with joints for, and between non-metals and metals which are shock prone. These materials include oxide ceramics, nitride ceramics, silicon nitride, molybdenum silicide, silicon carbide and a wide variety of nitride carbides, borides, oxynitrides, boro-carbides, carbon nitrides, diamond and other common engineering metallic materials including iron, aluminum, nickel, chromium, nickel, hafnium and tungsten containing and rare earth and transition metal alloys. The usefulness of many engineering ceramics critically depends on the ability to successfully join them. One critical application is igniters for use with natural gas. Other key applications are also found in electronic devices, especially in automobiles and spacecraft.

The joining of ceramics is also considered a viable alternative technology to methods of shape-processing of large products having complex geometric components. Similarly, such ceramic joining is desired for composites of metal and non-metal materials. Designers increasingly employ ceramic-metal inserts in machining operations which require good joining processes.

As such, it is necessary that ceramics, and other non-metals, be well bonded to metal parts. Joining, as part of a manufacturing route, can offer significant advantages for the fabrication of ceramic components, whereas it is essential for fabricating ceramic-to-metal combinations.

The joining of ceramics to themselves, or to metals/composites, is a difficult process with severe requirements to obtain perfect integrity during use. Ceramics such as moly-silicides, silicon carbides and $Si_3N_4$ (silicon nitride), including combinations, are required for high-temperature situations. Such are also expected to survive in corrosive environments at high-temperatures while under stress. The joints are expected to survive severe thermal, chemical and electrical gradients. The joining process should be cost effective for the overall manufacturing cost. The joining process should also not create any distortions. Brazing is a low temperature process that offers low distortion.

This application addresses well-known problems associated with the above-mentioned joining processes. Several braze alloys have been proposed. For example, with brazing temperatures of 800° C. or higher, Ag—Cu—Ti filler metals may be used, but the joints realized with these brazes can hardly survive above 400° C. in oxidizing environments even though the braze alloys are designed to melt at much higher temperatures.

The obvious way to increase the refractoriness of the joints is by using more refractory filler metals or intelligent ternary and quaternary alloys, thus escalating the manufacturing costs and undermining the materials stabilities. What would be ideal is a joining process that allows for joining at low temperatures yet yields joints that can last at much higher temperatures. However, braze alloys are expensive, often requiring the use of silver and other costly materials.

Generally, eutectic alloys are chosen to maintain a low braze temperature. Eutectic alloys including, silver-copper, Au—Pd eutectic compositions, Pd—Ni and Ni—Cr, for example, satisfy this criterion. Among these filler metals only the Ni—Cr ones can loosely be classified as active-metal brazes. Several commercial braze metals can be identified, with liquid to solid temperatures that are around 900° C. Many technically important ceramics, including silicon nitride, and carbides of silicon and molybdenum are not well wetted by conventional filler metals. Similarly, aluminides are difficult to wet. Recent developments, however, have led to a new class of brazes. These active metal brazes react chemically with the ceramic to form wettable products on their surfaces and, thus, do not require prior modification of the ceramic surface. But, the service temperatures achievable with the common active brazes that are based on Ag—Cu matrices are low. The Ni brazes with active additives, such as Cr, have been considered as refractory alternatives. Silicon nitride joints have been made via brazing with a commercial active Au—Ni—V filler metal. In general, brazing with this filler metal is not as easy and straightforward as with the Ag—Cu—Ti active braze alloys. Useful joint strength values, ±400 MPa, have been achieved, with slight improvement of the joint strength when bonding in argon environment. The use of inert environments and the use of silver make brazing operation costly. Alternatives are required.

SUMMARY

This application presents an alternative braze to use in the above applications. It has been have found that pure aluminum (Al) is an effective filler which overcomes many of the problematic issues previously named. Even though aluminum melts at 661° C., remarkable, quickly developed bond strengths and use temperatures are achieved, particularly when used with carbide, oxide, nitride and silicide materials. An effective measure of high joint temperatures is encountered for igniters which should be brazed and used at a low temperature but must maintain electrical conductivity and strength at high-temperatures. This is a particularly severe application where cycling is required with little loss of conductivity. It has been found that such properties are noted when using aluminum as a braze material. By using this new aluminum braze, considerable energy savings and costs of manufacture are attained. Brazing, which is traditionally a batch process, may be effectively and easily transformed into a continuous process because this type of braze can be employed in air or nitrogen atmosphere as opposed to requiring an inert atmosphere.

DRAWINGS—FIGURES

DRAWINGS—REFERENCE NUMERALS

Figure 1:
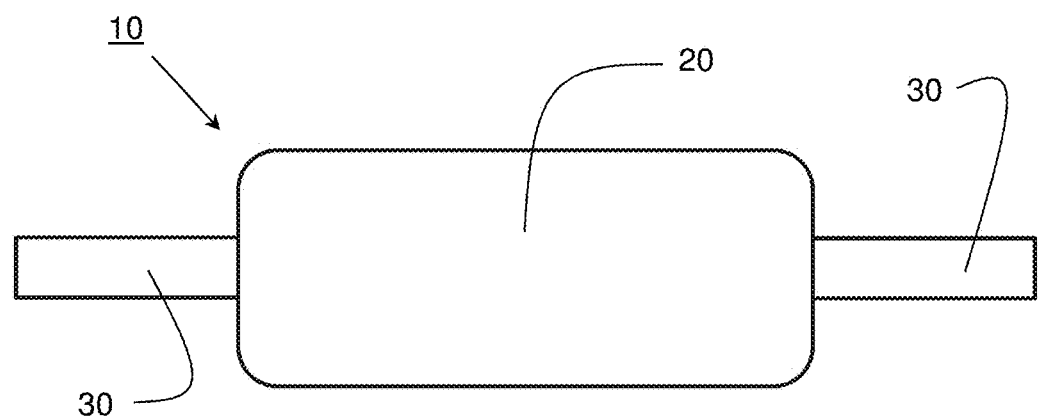
FIG. 1 is an overall view embodiment of a structure having multiple components joined together with pure aluminum braze.

| 10. | high temperature structure | 20. | core |
| --- | --- | --- | --- |
| 30. | lead | 40. | braze joint |

DETAILED DESCRIPTION

The use of, and need for, an effective braze for turbomachinery, ignitors, electronics, structural parts, etc., especially when high-temperature use is required, has grown in recent years. The increasing use of natural gas in automobiles and home heating requires ignitors that work at temperatures above 1000° C. The applicants have found that igniters (ignitors) assembled with pure aluminum braze exhibit very good performance in terms of temperature, cyclability and life.

In the past, eutectic or similar alloys were preferred for the reasons of low temperature and high fluidity for brazing. This, however, had taught away from pure materials because brazing then required special protective atmospheres. However, pure (even 99%) aluminum presents a distinctly different case. Aluminum oxide (a thin layer) protects both solid and liquid aluminum from oxidation especially in constrained conditions like attaching terminals to heaters. Pure aluminum is protected well by its oxide unlike many other metals.

An embodiment of such an igniter would comprise leads or contacts made from iron or some other metal. Between these leads would be positioned an element or filament comprised of a ceramic such as silicon carbide or nitride. Typically, the ceramic would be of a much smaller diameter than that of the leads, however the ceramic could be much larger than the leads or comprised of other thin filaments embedded in ceramic or ceramic like materials. The leads may be hollowed out at the ends nearest the ceramic. Pure aluminum or aluminum alloy would be placed in the hollows as well as the ends of the ceramic. The aluminum may be melted to affix the ceramic to the leads. Friction welding may be used to melt the aluminum in some applications to apply the braze uniformly.

There is considerable energy used when a protective atmosphere must be provided in brazing furnaces. Some of the atmospheres are created by fluxes which could be very toxic as they contain chlorides and fluorides. There is a loss of productivity when using furnaces with atmospheres or when cleaning residual fluxes. Such problems can be avoided if just pure aluminum is used without the use of fluxes. Aluminum is low melting and can maintain high flowability when protected against oxidation. When reacted, the products are conductive and high melting. Therefore, in constrained situations and with the use of foils, pure aluminum is effective in brazing applications with high productivity and lower energy usage. Table 1 shows how reactive pure aluminum behaves with many materials that either contain iron, silicon or other commonly used ceramics in heaters.

One embodiment envisions igniters with leads attached with foil inserted prior to braze between metal and non-metal. Such igniters may be used for gas ignition or black body applications. Normally leads are brazed with Ag—Cu commercial grade (e.g. a braze paste, power or foil of CuSil (a tradename) of materials made by Morgan Materials, Cleveland Ohio). The applicants have found that with a thin foil (20 microns to 200 microns) of pure aluminum or aluminum alloy one can braze, joining and wet silicon nitride, as well as many other ceramics mentioned above, with metal having better integrity than when made with the commercial braze alloys.

One method for the application of the aluminum based braze is with the use of the cascade e-ion rapid process (thermal plasma) that enables rapid braze joints since aluminum brazes can additionally have multifunctional functionally graded layers. Joint conductivity was found to be maintained over 1300° C. when aluminum was used as the braze. As an example, the items to be brazed and the braze are immersed in a thermal plasma plume containing ions (open plasma). The thermal plasma methods and devices contemplated are those disclosed in U.S. Pat. No. 9,643,877, issued on May 9, 2017 entitled "Thermal Plasma Treatment Method" and US patent application Ser. No. 15/600,824, filed May 22, 2017 entitled "Method and Apparatus Employing Fermion and Boson Mutual Cascade Multiplier for Beneficial Material Processing Kinetics", each by the present applicants, the disclosures of which are both incorporated by reference herein in their entireties.

With the use of plasma immersion, brazing with aluminum did not require inert atmosphere when ignitors were assembled or in other anticipated brazing applications. This is a distinct departure from normal brazing requirements. However, an ionic, nitrogen or nitrogen-hydrogen environment may also be employed. When inert gas required brazing is performed, the process can take many hours and require an enclosure. When using aluminum and just air, or nitrogen, more than 100 parts can be made easily per hour with just the use of 10 KWhr of electrical energy compared to over 500 KWhr energy amount requirement in batch brazing processes. The aluminum processes allow continuous operation. Traditional furnace-based batch treatment for brazing, as described above, could be expensive in terms of energy consumption. Batch processes are often inefficient and expensive, additionally, because of high furnace and facilities costs. Other costs from batch brazing include frequent maintenance and repair with specialized labor. Extra steps, such as, plasma cleaning or blanking parts may be required, but are not usually required with aluminum-based brazing. Conventional furnace brazing is often done with a 100-300 kW batch furnace. A continuous aluminum brazing machine may be rated for just 15 kW. The one-hour operational cost for a 300 kW machine at 10c/kWh is $30. The one-hour electric operational cost for a 15 KW braze machine is about $1.50. For 200 days, this equates to $144,000 vs. $7,200 in electric cost.

A plausible reason that aluminum works well with oxides, carbides and nitrides is that, effectively, any detrimental interface phase is easily reduced to a conducting phase with high-temperature composite microstructures by the aluminum. Silica and/or iron chromium oxides are reduced easily to form a conducting phase and a reinforcing phase. The presence of nitrogen can provide an additional reinforcing conductive phase. Multifunctional layers are contemplated as well.

It appears that aluminum is quickly able to reduce oxides like silica or iron oxides and produce a conduction silicon or iron phase. If using nitrogen, a silicon nitride phase may be produced as shown below in Table 1.

$$3SiO_2 + 4Al + 2N_2(g) = 2Al_2O_3 + Si_3N_4$$

TABLE 1

The reaction of aluminum and silica in a nitrogen environment. H is enthalpy, S is entropy, G is Gibbs free energy and K is the equilibrium constant all pertaining to the reaction. T is temperature.

| T °C. | delta H kcal | delta S cal/K | delta G Kcal | K | Log(K) |
|---:|---:|---:|---:|---:|---:|
| 0.000 | −345.752 | −107.744 | −316.321 | 1.296E+253 | 253.113 |
| 100.000 | −346.632 | −110.524 | −305.390 | 7.552E+178 | 178.878 |
| 200.000 | −347.086 | −111.620 | −294.273 | 8.648E+135 | 135.937 |
| 300.000 | −347.257 | −111.953 | −283.091 | 9.020E+107 | 107.955 |
| 400.000 | −347.373 | −112.139 | −271.887 | 1.906E+088 | 88.280 |
| 500.000 | −347.693 | −112.577 | −260.654 | 4.858E+073 | 73.686 |
| 600.000 | −348.691 | −113.780 | −249.344 | 2.607E+062 | 62.416 |
| 700.000 | −358.969 | −124.796 | −237.524 | 2.226E+053 | 53.347 |
| 800.000 | −358.808 | −124.640 | −225.051 | 6.856E+045 | 45.836 |
| 900.000 | −358.808 | −125.782 | −212.471 | 3.848E+039 | 39.585 |
| 1000.000 | −359.726 | −125.532 | −199.905 | 2.083E+034 | 34.319 |

This is a notable invention because, in the past, it was assumed that aluminum had too low a melting point to be an effective braze and because brazes were always designed for flowability that a eutectic offers. However, as shown by V Gopalakrishna and J A Sekhar, in *Thermal Analysis and Flowability Correlations in Iron—Carbon—Silicon Alloys, I and II*, Transactions of the American Foundrymen's Society, 1987, in certain instances, pure materials can also provide high flowability. In applications such as ignition and heating, where resistance is a key factor, the use of pure aluminum as a braze has proven to be effective. When subjected to an electrical current, the pure aluminum braze in a jointed structure, such as an igniter, is less resistant than alloyed aluminum brazes and therefore heats up and oxidizes less. However, the use of alloying elements of up to one atomic percent of the pure aluminum is contemplated as well.

The use of steam, steam ions, hydrogen, inert gasses and nitrogen and their ions and combinations during processing or cooling is also contemplated. Argon or other inert gasses, nitrogen hydrogen mixture gasses or hydrogen or other reducing or oxidizing gasses as required are contemplated as well. Braze joints made in this way can hold up to high-temperatures over 30-100° C. with high cyclability. Uses are also contemplated for joining purposes in the food and antibacterial industry, especially where the preservation of nanostructures may become important in the structure.

Figure 2:
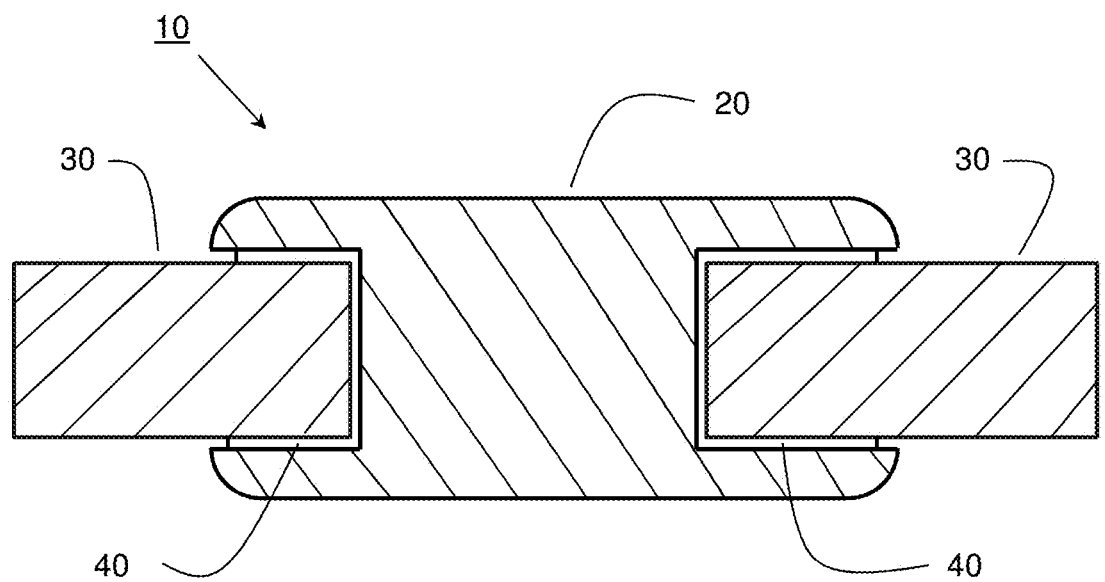
FIG. 2 is a cut-away view embodiment of a structure having multiple components joined together with pure aluminum braze showing the braze in the joint between components.

An embodiment of an anticipated device is depicted in FIGS. 1 and 2. A high temperature structure 10 is shown comprising a core 20, leads 30 and braze joints 40. The leads 30 are secured into the core 20 by the braze material of the braze joint 40. The leads may be comprised of iron or other suitable materials listed in the background section above. The core 20 may be comprised of metal or non-metals, such as ceramic (anticipated ceramics include molysilicides, silicon carbides and $Si_3N_4$ (silicon nitride)) or other materials also listed above in the background section. The leads 30 may be positioned in-line in the core 20 or be side-by-side. In this embodiment the leads 30 are separated from each other by core material and brazing material. When assembled, the braze joint 40 may be initially comprised of pure aluminum braze material in the form of a foil. The structure is subsequently subjected to heat allowing the aluminum foil to melt and for the braze joint 40. The melting heat source may be a thermal plasma or through a friction process. Other types of braze materials and forms are anticipated as well.

In operation, a power source (not pictured) is connected to the leads 30. Electrical current is run through the leads 30 and the core 20 thereby heating the structure 10. The electrical resistance of the core material produces a heat useful in ignition, heating as well as other applications.

The above descriptions provide examples of specifics of possible embodiments of the application and should not be used to limit the scope of all possible embodiments. Thus, the scope of the embodiments should not be limited by the examples and descriptions given but should be determined from the claims and their legal equivalents.

I claim:

1. A method for the joining of components of a structure, wherein a first components is comprised of iron or iron alloys and a second component is comprised of a non-metal, for use at high temperatures comprising; positioning pure aluminum braze in the joint between mating surfaces of the components and subjecting the components of the structure and the braze to a temperature, in a non-vacuum environment, sufficient to melt the pure aluminum braze.

2. The method of claim 1 wherein the pure aluminum braze is in foil form.

3. The method of claim 1 further comprising pre-heating the structure.

4. The method of claim 1 wherein the braze material is melted through immersion in a thermal plasma plume.

5. The method of claim 1 wherein the braze material is melted in an ionic atmosphere.

6. The method of claim 1 wherein the non-metal of the second components of the structure is comprised of a ceramic.

7. The method of claim 1 wherein the non-vacuum environment is comprised of air.

8. The method of claim 1 wherein the pure aluminum braze is in direct contact with the surfaces of the components.

9. The method of claim 1 wherein the first component is further comprised of nickel.

* * * * *